US007002067B2

(12) United States Patent
Teel

(10) Patent No.: US 7,002,067 B2
(45) Date of Patent: Feb. 21, 2006

(54) WRIST POSITION TRAINING ASSEMBLY

(76) Inventor: Kenneth A. Teel, 28914 Shadow Valley La., Saugus, CA (US) 91390

(*) Notice: Subject to any disclaimer, the term of this patent is extended or adjusted under 35 U.S.C. 154(b) by 0 days.

(21) Appl. No.: 10/899,476

(22) Filed: Jul. 26, 2004

(65) Prior Publication Data

US 2005/0028668 A1 Feb. 10, 2005

Related U.S. Application Data

(60) Provisional application No. 60/493,009, filed on Aug. 5, 2003.

(51) Int. Cl.
*G09B 15/06* (2006.01)

(52) U.S. Cl. .......................................... 84/468; 84/469

(58) Field of Classification Search ................ 400/489, 400/485, 486, 494; 84/468
See application file for complete search history.

(56) References Cited

U.S. PATENT DOCUMENTS

| | | | |
|---|---|---|---|
| 6,558 | A | 6/1849 | Von Heeringen |
| 84,844 | A | 12/1868 | Sangalli |
| 109,582 | A | 11/1870 | Buchberger |
| 151,198 | A | 5/1874 | Brewster |
| 173,205 | A | 2/1876 | Bohrer |
| 204,260 | A | 5/1878 | Sudderick |
| 240,268 | A | 4/1881 | Power |
| 326,444 | A | 9/1885 | Meyering |
| 356,236 | A | 1/1887 | Wright |
| 482,737 | A | 9/1892 | Hauff |
| 492,889 | A | 3/1893 | Kirk |
| 519,675 | A | 5/1894 | Heinrich |
| 549,824 | A | 11/1895 | Schneider |
| 582,673 | A | 5/1897 | Norcross |
| 591,800 | A | 10/1897 | Finnblade |
| 679,288 | A | 7/1901 | Bohrer |
| 1,112,735 | A | 10/1914 | Vogel |

(Continued)

*Primary Examiner*—Kimberly Lockett
(74) *Attorney, Agent, or Firm*—Bruce A. Jagger

(57) ABSTRACT

A wrist training assembly that is intended for use by releasably clamping it to a piano keyboard with a predetermined amount of clamping force. The assembly is releasably locked in place but the clamping and locking functions are separated so that the finish and structure of the piano are protected. The assembly is rapidly installed and uninstalled from a wide variety of pianos without alteration to either the pianos or the assembly. The keyslip of the piano has a first face that faces and is spaced from the keys to define a channel between the piano keys and the first face. A training bar member is mounted to a clamping unit so that it extends a predetermined distance from and generally parallel to the channel. Preferably, two spaced apart mounting hook members are pivotally mounted to the training bar member and adapted to engage with the first face of the keyslip. The clamping unit is moveably mounted to the training bar member and resiliently biased towards the mounting hook member by a predetermined amount of spring tension. The amount of spring tension is pre-selected and is not adjustable by the user. The clamping unit includes a bearing face that is opposed to the mounting hook members and is adapted to bear resiliently against the piano. The amount of spring tension is pre-set at such a level that the bearing face will not mar or distort the piano structure or finish. Once the bearing face is engaged with the piano under the urging of the predetermined spring tension, a releasable detent member is actuated to lock the clamping unit relative to the training bar member and the associated mounting hook members.

9 Claims, 4 Drawing Sheets

U.S. PATENT DOCUMENTS 1,219,747 A 3/1917 Kittel
1,343,595 A 6/1920 Tiffany
1,359,928 A 11/1920 Stafford
1,722,410 A 7/1929 Cherniavsky
1,865,370 A 6/1932 Hon et al.
2,438,820 A 3/1948 Obuchowski
5,082,258 A * 1/1992 Niks .......................... 84/469
5,567,067 A 10/1996 Ambrose
5,753,840 A 5/1998 Saboia De Albuquerque
5,876,362 A 3/1999 Root
6,217,537 B1 4/2001 Root
6,271,452 B1 8/2001 Bernard
6,911,011 B1 * 6/2005 Haag .......................... 601/40

* cited by examiner

WRIST POSITION TRAINING ASSEMBLY

RELEATED APPLICATION

Applicant claims the benefit of Provisional No. 60/493, 009, filed Aug. 5, 2003.

BACKGROUND OF THE INVENTION

1. Field of the Invention

The invention relates in general to methods and devices for the correction or training of a student piano player's wrist position, and, more particularly, embodiments of the present invention relate to a wrist posture training device for detachably mounting to a piano.

2. Description of the Prior Art

Previous expedients proposed for the purpose of correcting or training the wrist position of a piano student include, for example, Buchberger U.S. Pat. No. 109,582, patented Nov. 29, 1870 (screw actuated vertically mounted C-clamps are attached to the front of a piano adjacent to the keyboard and a bar is mounted through standards to the C-clamps so that it extends along the front of the keyboard); Wright et al. U.S. Pat. No. 356,236, patented Jan. 18, 1887 (a bar is mounted through screw actuated longitudinally mounted C-clamps to the sides of a piano and a bar is mounted between the C-clamps so that it extends in front of the keyboard); Hauff U.S. Pat. No. 482,737, patented Sep. 20, 1892 (the mount for a wrist support bar is either screwed to the piano or separately supported by a floor mounted stand); Kirk U.S. Pat. No. 492,889, patented Mar. 7, 1893 (a rail is mounted to a stand that rests on the floor and wrist supporting trolleys are rollingly mounted on the rail); Norcross U.S. Pat. No. 582,673, patented May 18, 1897 (a wrist support rod is mounted to base plates that are mounted by screws to underside of the piano); and Vogel U.S. Pat. No. 1,112,735, Patented Oct. 6, 1914 (screw actuated vertically mounted C-clamps are attached to the front of a piano adjacent to the keyboard and a bar is mounted between the C-clamps so that it extends along the front of the keyboard).

The prior art devices and methods are not without their shortcomings. A major shortcoming of typical prior art devices and methods is that the mounting of the training device to the piano risks marring the finish and appearance of the piano, and may impair its functioning. Also, the mountings are often of a permanent or semi-permanent nature so that the device can not be easily moved from one piano to another without substantial effort or modification of the piano or device, or both.

These and other difficulties of the prior art have been overcome according to the present invention.

BRIEF SUMMARY OF THE INVENTION

The present invention has been developed in response to the current state of the art, and in particular, in response to these and other problems and needs that have not been fully or completely solved by currently available training devices. Thus, it is an overall object of the present invention to effectively resolve at least the problems and shortcomings identified herein. In particular, it is an object of the present invention to provide a wrist training assembly that releasably mounts to a piano without marring the finish or appearance of the piano. According to the present invention, a training device is resiliently mounted to a piano with an amount of spring tension that is calibrated to be benign to the finish and appearance of the piano. It is also an object of the present invention to provide a releasable detent that holds the training assembly in operative position. Finally, it is an object of the present invention to provide a training assembly in which the mount for the training bar resiliently engages the piano and is retained in the engaged position by a releasable detent such that the function of providing the resilient clamping action is separated from the mount locking function. The degree of well distributed clamping force provided by the resilient clamping action is carefully predetermined to be less than that which is likely to damage the finish, and the training assembly is locked in position by an independently acting detent element that presents no significant risk to the finish or appearance of the piano because it does not contribute to the force of the clamping action.

A preferred embodiment of the wrist training assembly according to the present invention comprises an assembly that is intended for use with a piano keyboard. The keyslip of the piano has a first face that faces and is spaced from the keys to define a channel between the ends of the piano keys and the first face. A training bar member is mounted to a clamping unit so that the training bar member extends a predetermined distance from and generally parallel to the channel. Preferably, two spaced apart mounting hook members are pivotally mounted to the training bar member. The mounting hook members are adapted to extend into and engage with the first face of the keyslip within the channel between the ends of the keys and the keyslip. The mounting hook members generally define at least the lateral spacing of the training bar member from the keyboard. A clamping unit is moveably mounted to the training bar member. The clamping unit is resiliently biased towards the mounting hook members with a predetermined amount of spring tension. For the protection of the piano, the amount of spring tension is pre-selected and is not adjustable by the user. The clamping unit includes a bearing face that is adapted to bear resiliently against the piano with the amount of pre-selected spring tension. The bearing face is intended to bear against the piano at a location that is generally opposed to the first face. The amount of spring tension is pre-set at such a level that the bearing face will not mar or distort the piano structure or finish. Once the bearing face is engaged with the piano under the urging of the predetermined spring tension, a releasable detent member is actuated to lock the clamping unit relative to the training bar member and the associated mounting hook members.

The functions of clamping and locking are separated to protect the finish, function, and structure of the piano. The clamping force is pre-determined by the spring tension and is not influenced to any substantial degree by the locking or unlocking of the detent member. The pivotal mounting of the mounting hook members allows the wrist training assembly to adjust itself automatically to the configuration of the piano so there is no risk of marring, distorting or otherwise impairing the piano. Unlocking the detent member allows the clamping unit to be moved against the spring tension relative to the training bar member. The mounting hook members can be disengaged from the inner face of the keyslip, and the assembly removed from the piano. Sufficient range of movement is provided between the clamping unit and the training bar member to permit the accommodation of virtually every piano design. Pianos usually, but not necessarily, have a fascia board projecting outwardly of the keyslip. If such a fascia board or some other decorative or structural member is present at this location, the bearing face bears against this fascia board or other member. The clamping action is between the mounting hook members and the bearing face. Preferably, the force applied by the bearing face is distributed over the front of the piano so that there is no potentially damaging concentration of force at one location.

To acquaint persons skilled in the pertinent arts most closely related to the present invention, a preferred embodiment of a wrist training assembly that illustrates a best mode now contemplated for putting the invention into practice is described herein by, and with reference to the annexed drawings that form a part of the specification. The exemplary assembly is described in detail without attempting to show all of the various forms and modifications in which the invention might be embodied. As such, the embodiments shown and described herein are illustrative, and as will become apparent to those skilled in the arts, can be modified in numerous ways within the scope and spirit of the invention, the invention being measured by the appended claims and not by the details of the specification or drawings.

In operation, the clamping unit of the wrist training assembly is moved relative to the training arm member against the pre-determined spring tension until the space between the mounting hook members and the bearing face is greater than the thickness of the front of the piano at the location where the assembly is to be mounted. The mounting hook members are engaged with the rear face of the keyslip in the channel between the keyslip and the ends of the keys of the keyboard. The clamping unit is slowly and carefully released and the pre-set spring tension is allowed to move the clamping unit relative to the training arm member to clamp the front of the piano between the mounting hook members and the bearing face. The distance between the keyboard and the training arm member is generally determined by the distance the mounting hook members project laterally from the training arm member, and does not change as the clamping unit advances towards the front of the piano. The clamping unit is then locked in place by actuation of the detent member. The preferably pivotally mounted hook members automatically adjust to the specific configuration of the particular piano so that the clamping force is substantially uniformly distributed across the front of the piano. Removal of the assembly entails unlocking the detent member, and withdrawing the bearing face from engagement with the front of the piano. The mounting hook members may then be lifted out of engagement with the keyslip, and removal is complete.

Other objects, advantages, and novel features of the present invention will become more fully apparent from the following detailed description of the invention when considered in conjunction with the accompanying drawings, or may be learned by the practice of the invention as set forth herein.

BRIEF DESCRIPTION OF THE DRAWINGS

The present invention provides its benefits across a broad spectrum of wrist training assemblies. While the description which follows hereinafter is meant to be representative of a number of such applications, it is not exhaustive. As those skilled in the art will recognize, the basic apparatus and method taught herein can be readily adapted to many uses. This specification and the claims appended hereto should be accorded a breadth in keeping with the scope and spirit of the invention being disclosed despite what might appear to be limiting language imposed by the requirements of referring to the specific examples disclosed.

Referring particularly to the drawings for the purposes of illustrating the invention and its presently understood best mode only and not limitation.

DETAILED DESCRIPTION OF THE PREFERRED EMBODIMENTS

Figure 1:
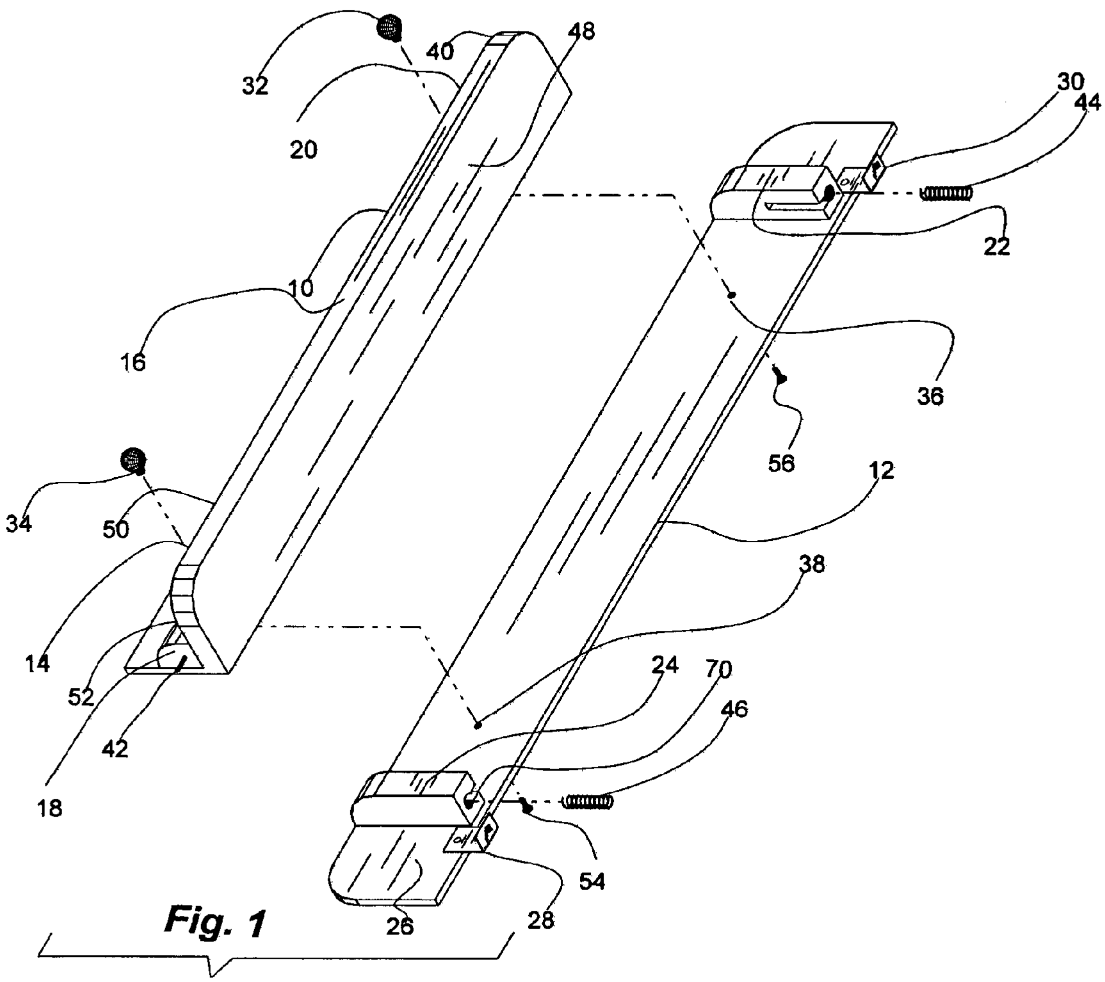
FIG. 1 is an exploded perspective view of a preferred embodiment of the wrist training assembly of the invention showing the training bar, hook members, clamping panel, and detent.
Figure 2:
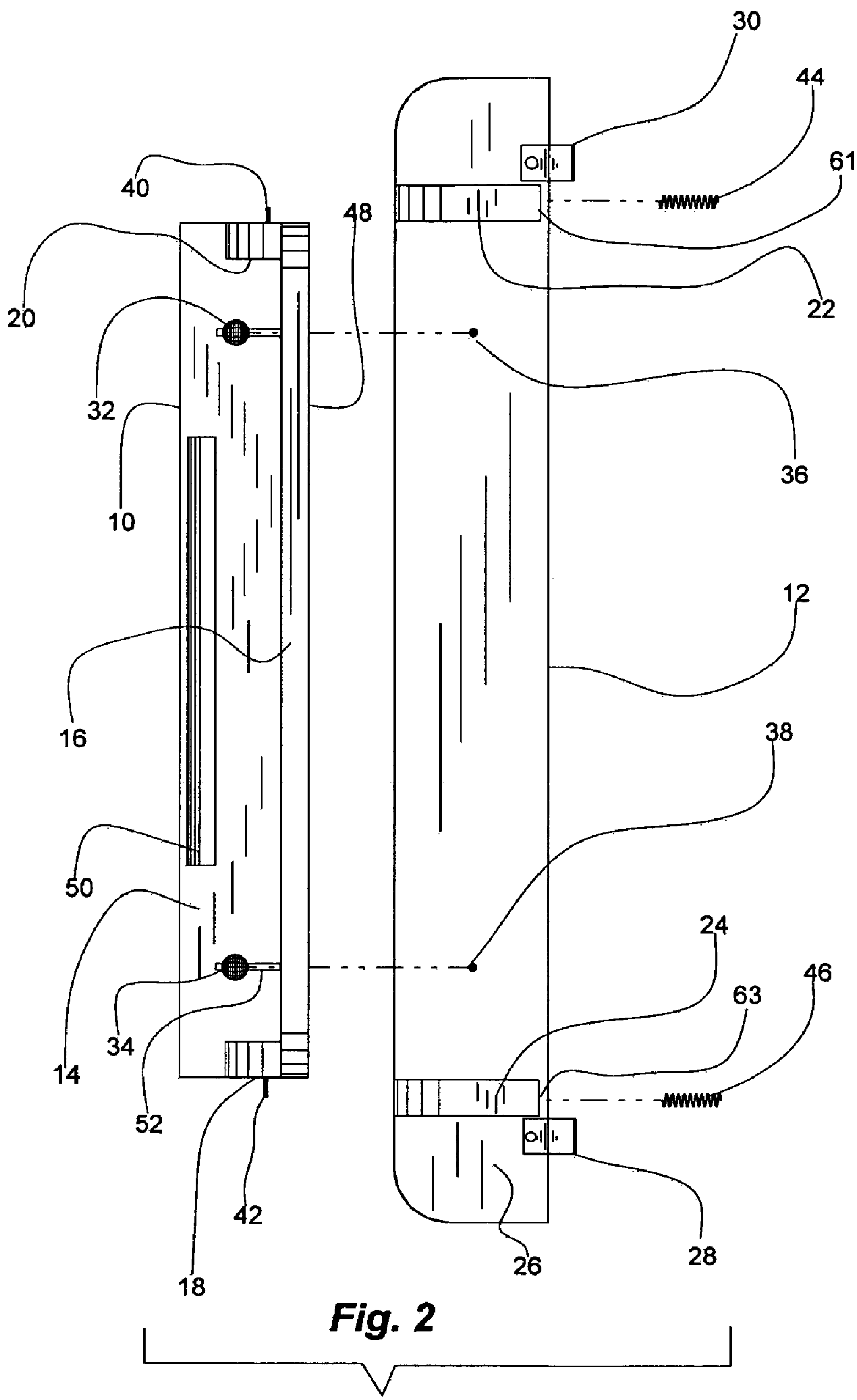
FIG. 2 is an exploded bottom plan view of the embodiment of FIG. 1.

Referring now to the drawings wherein like reference numerals designate approximately identical or corresponding parts throughout the several views. It is to be understood that the drawings are diagrammatic and schematic representations of various embodiments of the invention, and are not to be construed as limiting the invention in any way. The use of words and phrases herein with reference to specific embodiments is not intended to limit the meanings of such words and phrases to those specific embodiments. Words and phrases herein are intended to have their ordinary meanings, unless a specific definition is set forth at length herein.

Referring particularly to the drawings, there is illustrated generally at 10, a clamping unit comprised of a clamping panel 16 having, for example, a bearing face 48 mounted to a sliding panel 14. Angle blocks 18 and 20, respectively, serve to brace panels 10 and 14 and hold them in operable angular relationship to one another. Clamping panel 16 is, for example, carried by and moves with sliding panel 14. Rail 50, for example, provides a convenient handle for manually grasping and slidably moving clamping unit 10 relative to training bar member 12. Clamping unit 10 is, for example, slidably moved over surface 26 of training bar member 12 either by the application of manual force to rail 50 or the bias of spring tension. As will be appreciated by those skilled in the art, other forms of relative movement and actuation of relative movement are within the teachings of the present invention. A predetermined amount of spring tension is applied to clamping unit 10 by, for example, springs 44 and 46 acting against pins 40 and 42. Springs 44 and 46 are mounted in spring mounting blocks 22 and 24, respectively, which are mounted to surface 26 of training bar member 12. Springs 44 and 46 are mounted in key shaped pockets of which 70 is typical. Pins 40 and 42 are mounted to and project in longitudinally opposed directions from angle blocks 18 and 20 to engage springs 44 and 46, respectively. As will be understood by those skilled in the art, other forms of bias and bias mountings can be provided within the teachings of the present invention.

Releasable detent members lockingly associated with clamping unit 10 and training bar member 12 are provided, for example, by screws 54 and 56 mounted to and carried by training bar member 10 in holes 38 and 36, respectively. Screws 54 and 56 project into slots 52 and 66, respectively, within sliding panel 14, and are threadably engaged with threaded knobs 34 and 32, respectively. Threadably tightening threaded knobs 34 and 32 locks sliding panel 14 against surface 26, thus preventing relative movement between training bar member 12 and clamping unit 10.

Conversely, threadably loosening threaded knobs 34 and 32 unlocks the clamping unit 10 for sliding movement relative to training bar member 12. As will be understood by those skilled in the art, other forms of detent and detent actuation can be provided within the teachings of the present invention.

Figure 3:
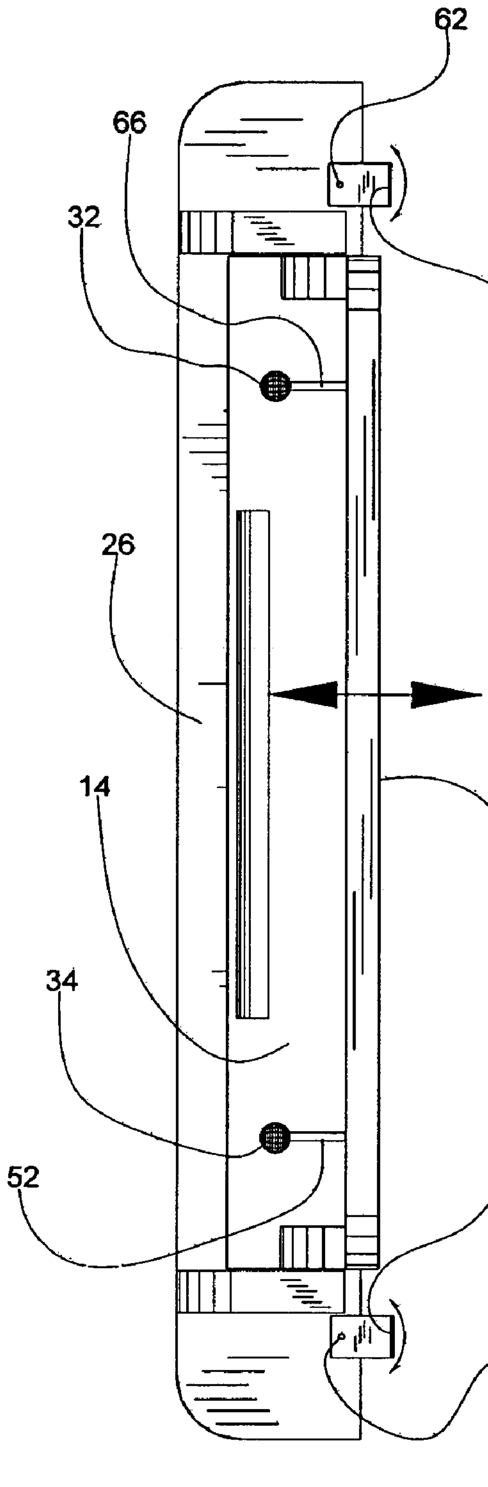
FIG. 3 is a bottom plan view of the embodiment of FIG. 1 showing the clamping panel in the position where it is closest to the hook members.
Figure 4:
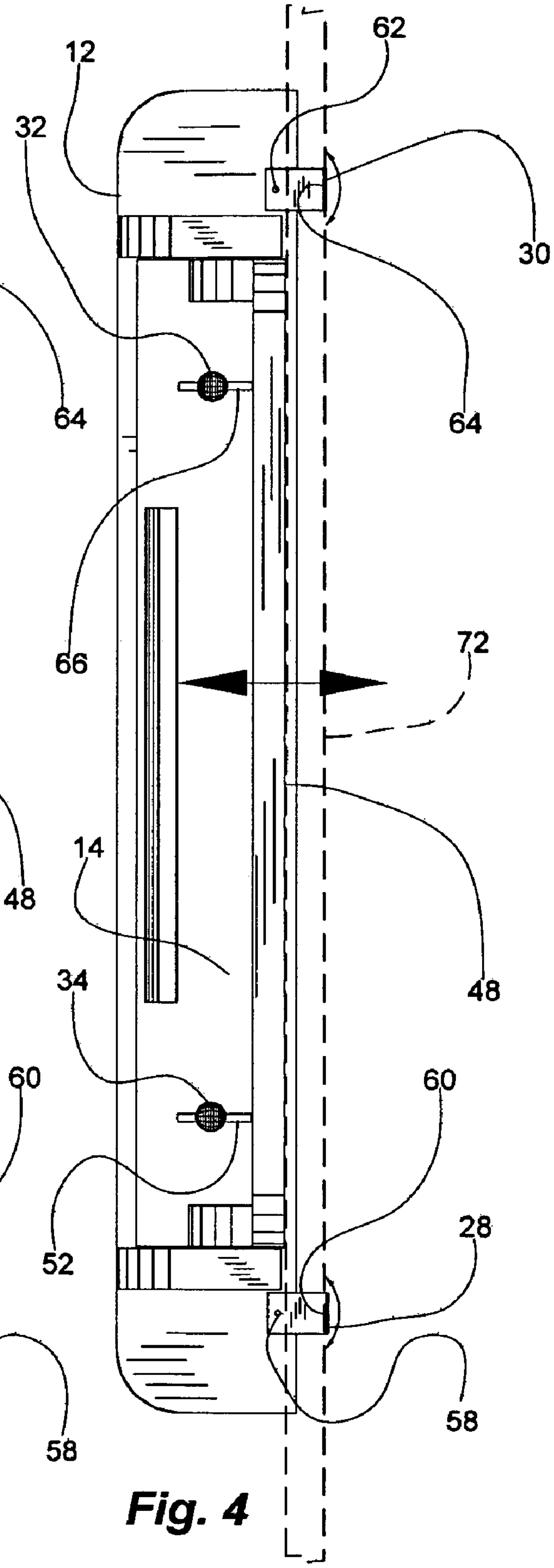
FIG. 4 is a bottom plan view similar to FIG. 3 showing the clamping panel in the position it normally occupies when clampingly engaged with a piano.
Figure 5:
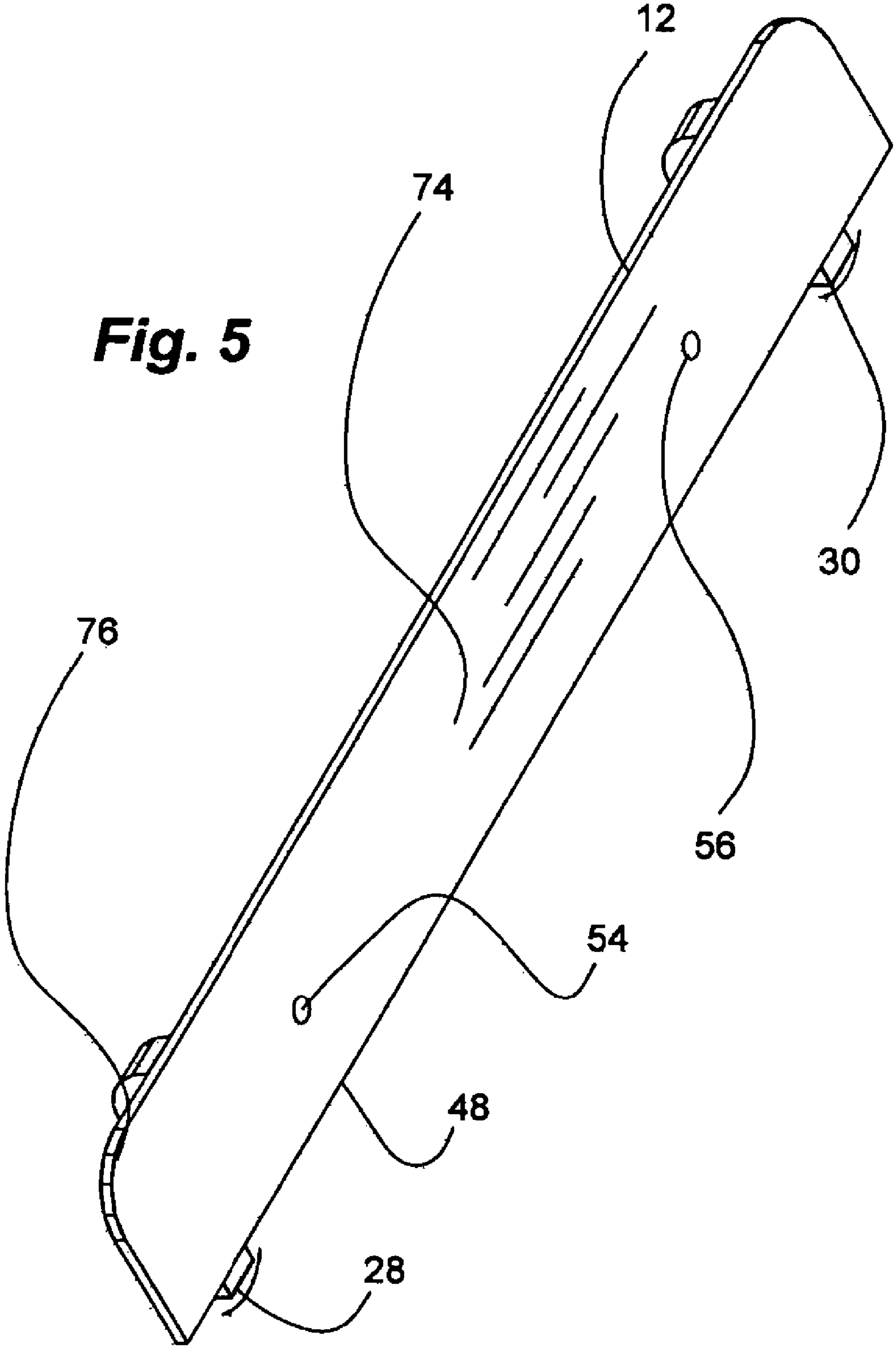
FIG. 5 is is a top persepective view showing the training bar and the hook members.

Mounting hook members for engagement with a keyslip 72 (FIG. 4) are conveniently provided, for example, by hook members 28 and 30 mounted through pivot members 58 and 62, respectively, to training bar member 12. A detent member is preferably associated with each hook member to provide for the individual accommodation of the configuration of the front of an individual piano. The faces 60 and 64 of the respective hook members are adapted to clampingly engage the inner face of the keyslip 72. Such engagement generally fixes the relative position of the training bar member to the piano. The clamping unit 10 moves relative to the keyslip 72, as indicated by the double headed arrows in FIGS. 3 and 4, to accomplish the desired clamping. In FIG. 4, for the purposes of ease of illustration, the bearing face 48 is illustrated clampingly abutted to the outer face of the keyslip 72. It will understood that other elements of the front of the piano may project outwardly of the keyslip and the bearing face 48 would then bear against them. The ends 61 and 63 of the respective spring mounting blocks are preferably set back from the edge of the training arm member to an extent that they are out of engagement with the front of the piano. There is preferably no interference to the engagement of the clamping unit with the outer face of the piano. As will be understood by those skilled in the art, other mounting hook members can be used and operated in other ways within the teachings of the present invention.

Training bar member can, for example, take the form of a generally flat panel adapted to extend for at least approximately two-thirds of the length of a piano keyboard, for example, approximately 30 to 35 inches. The lateral width of the training bar member should be no more than approximately half the length of a typical users forearm, for example, approximately 4 to 5 inches. The training bar member should be positioned approximately level with the keyboard and spaced out from the keyboard when installed, a distance that falls under the typical users wrists. Typically, the inner edge of the training bar member should be within approximately one to three inches of the outer ends of keys. In any event, it must be clear of the area where the user's fingers access the keys. The generally flat upper surface 74, bounded by arcuate corners of which 76 is typical, serves to inhibit the downward flexing of a user's wrists without restricting the users movement. Preferably, the user does not usually contact the training bar member. It is there to remind the user to pick up the wrists when they droop. The rounded corners' provide free movement without catching on the users clothing.

What have been described are preferred embodiments in which modifications and changes may be made without departing from the spirit and scope of the accompanying claims. Many modifications and variations of the present invention are possible in light of the above teachings. It is therefore to be understood that, within the scope of the appended claims, the invention may be practiced otherwise than as specifically described.

What is claimed is:

1. A wrist training assembly for use with a piano, said piano including piano keys in a keyboard, and a keyslip having a first face, said keyslip extending transversely of and spaced from said keyboard to define a channel between said piano keys and said first face, said wrist training assembly comprising:

- a training bar member adapted to extend a predetermined distance from and generally parallel to said keyboard;
- a mounting hook member adapted to hookingly engaging said first face in said channel and to generally define said predetermined distance;
- a clamping unit moveably mounted to said training bar member and resiliently biased towards said mounting hook member, said clamping unit being adapted to resiliently engaging said piano with a predetermined amount of spring tension at a location generally opposed to said first face; and
- a releasable detent member lockingly associated with said clamping unit and adapted to locking said clamping unit to said training bar member.

2. A wrist training assembly of claim 1 wherein said mounting hook member is pivotally mounted on said training bar member.

3. A wrist training assembly of claim 1 including two said mounting hook members, and said mounting hook members being pivotally mounted on said training bar member.

4. A wrist training assembly of claim 1 wherein said clamping unit includes a bearing face adapted to resiliently engaging said piano.

5. A method of associating a wrist training assembly with a piano, said piano including piano keys in a keyboard, and a keyslip extending transversely of and spaced from said keyboard to define a channel between said piano keys and a first face of said keyslip, said wrist training assembly including a training bar member adapted to extend a distance from and generally parallel to said keyboard, a mounting hook member adapted to hookingly engaging said first face in said channel and to generally define said distance, a clamping unit moveably mounted to said training bar member and resiliently biased towards said mounting hook member, said clamping unit being adapted to resiliently engaging said piano with a predetermined amount of spring tension at a location generally opposed to said first face, and a releasable detent member lockingly associated with said clamping unit and adapted to locking said clamping unit to said training bar member, said method comprising:

- engaging said mounting hook member with said first face in said channel;
- allowing said clamping unit to move relative to said training bar member under the urging of said spring tension to resiliently engage said piano with said predetermined amount of spring tension at a location generally opposed to said first face; and
- actuating said releasable detent member to lock said clamping unit to said training bar member.

6. A method of claim 5 wherein said wrist training assembly includes at least two mounting hook members pivotally mounted to said training bar member, and said method includes pivotally adjusting said mounting hook members to allow a bearing face of said clamping unit to bear uniformly against said piano.

7. A method of claim 5 including actuating said releasable detent member to release said clamping unit for movement relative to said training bar member, moving said clamping unit relative to said training bar member and against said spring tension, and disengaging said mounting hook member from said first face.

8. A wrist training assembly for use with a piano, said piano including piano keys in a keyboard, and a keyslip having a first face, said keyslip extending transversely of and spaced from said keyboard to define a channel between said piano keys and said first face, said wrist training assembly comprising:

a training bar member adapted to extend a predetermined distance from and generally parallel to said keyboard;

at least two mounting hook members pivotally mounted to said training bar member and adapted to hookingly engaging said first face in said channel and to generally define said predetermined distance;

a clamping unit moveably mounted to said training bar member and resiliently biased towards said mounting hook member, said clamping unit including a bearing face adapted to resiliently engaging said piano with a predetermined amount of spring tension at a location generally opposed to said first face; and a releasable detent member lockingly associated with said clamping unit and adapted to locking said clamping unit to said training bar member.

9. A wrist training assembly of claim 8 including a said releasable detent member operatively associated with each of said mounting hook members.

* * * * *